United States Patent [19]

Stevens et al.

[11] Patent Number: 5,544,413

[45] Date of Patent: Aug. 13, 1996

[54] METHOD AND APPARATUS FOR MANFACTURING A FLASHLESS METAL CONNECTING ROD

[75] Inventors: Robert J. Stevens; Terrance M. McInerney, both of Columbus, Ind.

[73] Assignee: Omni Forge, Inc., Remington, Ind.

[21] Appl. No.: 258,284

[22] Filed: Jun. 10, 1994

[51] Int. Cl.⁶ .................................................. B23P 15/00
[52] U.S. Cl. .................... 29/888.092; 29/558; 74/579 R; 74/579 E; 72/356; 72/335; 219/639
[58] Field of Search .................. 29/888.092, 888.09, 29/558; 219/635, 637, 639, 659; 74/579 R, 579 E; 72/356, 335, 342.1

[56] References Cited

U.S. PATENT DOCUMENTS

| | | | |
|---|---|---|---|
| 1,350,177 | 8/1920 | Pribil | 29/888.092 |
| 1,350,178 | 5/1920 | Pribil | 29/888.092 |
| 1,378,690 | 5/1921 | Layman . | |
| 1,400,829 | 12/1921 | Oakley . | |
| 1,791,187 | 2/1931 | Brauchler . | |
| 2,169,894 | 8/1939 | Criley . | |
| 2,502,737 | 4/1950 | Meley et al. . | |
| 3,737,609 | 8/1971 | Overkott | 219/10.41 |
| 3,751,080 | 9/1973 | Bailey et al. . | |
| 4,222,260 | 9/1980 | McDermott | 72/345 |
| 4,458,555 | 7/1984 | Holtzberg et al. . | |
| 4,748,708 | 6/1988 | Schlicht | 10/63 |
| 4,827,795 | 5/1989 | Machida et al. . | |
| 4,838,062 | 6/1989 | Prenn . | |
| 4,848,129 | 7/1989 | Delio | 72/374 |
| 4,910,990 | 3/1990 | Delio . | |
| 4,967,584 | 11/1990 | Sato et al. . | |
| 4,993,134 | 2/1991 | Hoag et al. . | |
| 5,157,232 | 10/1992 | Pfaffmann | 219/10.57 |

FOREIGN PATENT DOCUMENTS 0253138  11/1986  Japan .

*Primary Examiner*—Irene Cuda
*Assistant Examiner*—Marc W. Butler
*Attorney, Agent, or Firm*—Harness, Dickey & Pierce, P.L.C.

[57] ABSTRACT

A flashless metal connecting rod of the type having a one-piece construction and being fracturable into a cap portion and a body portion is produced by providing a precise preform of predetermined dimensions and a precise weight, induction heating the preform to a suitable forging temperature, sequentially compressing the preform between a plurality of unique sets of forging dies. The resulting final forging is both flashless and burrless. Preferably, the sequential compressing of the preform is accomplished through three sets of forging dies which progressively form the precision preform to its ultimate shape.

14 Claims, 3 Drawing Sheets

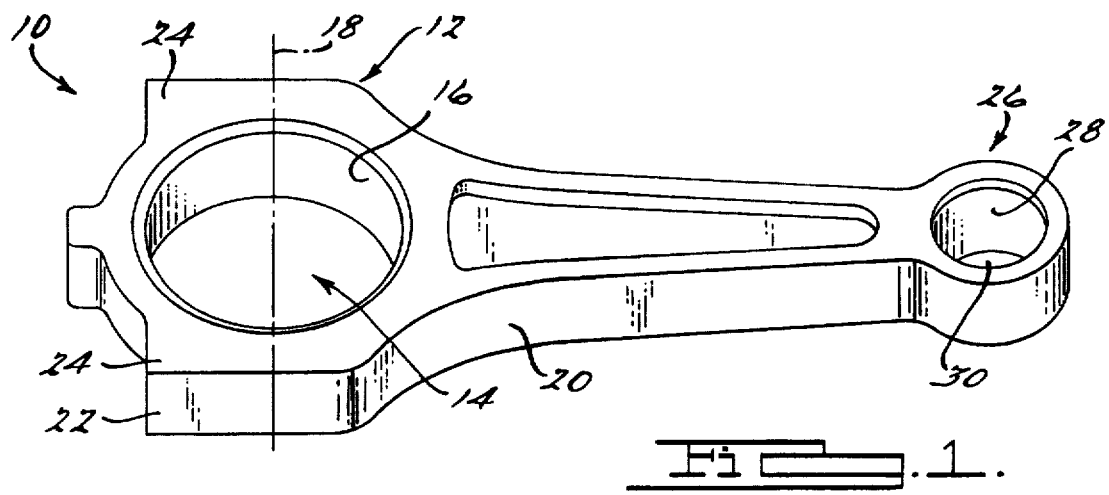
FIG. 1.
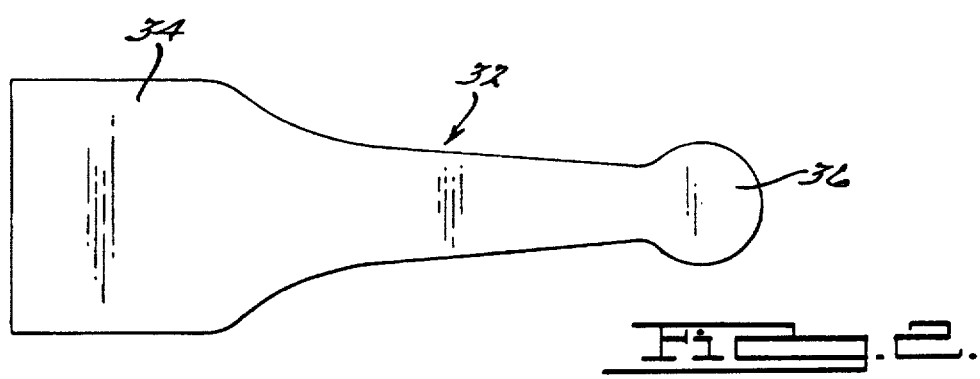
FIG. 2.
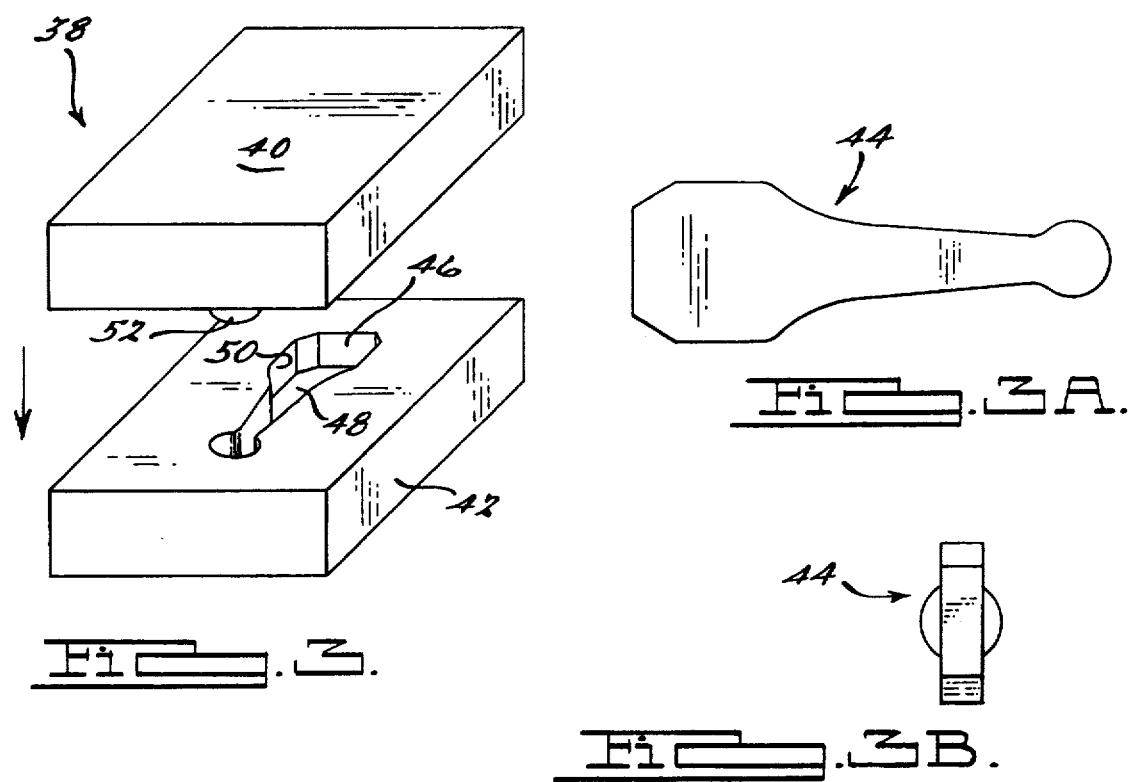
FIG. 3.
FIG. 3A.
FIG. 3B.

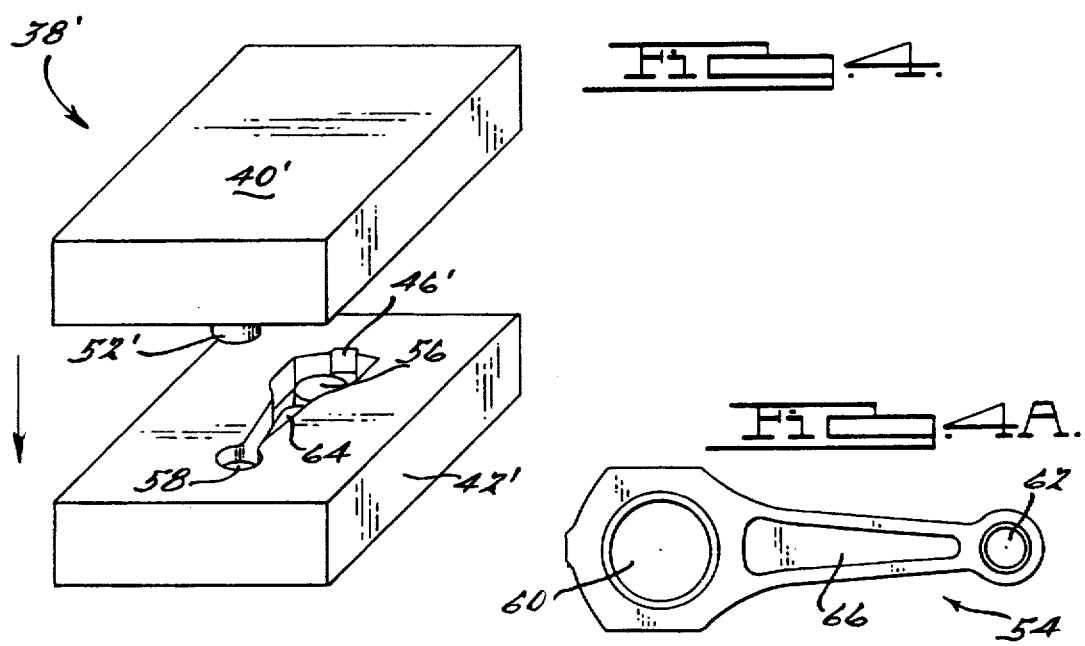
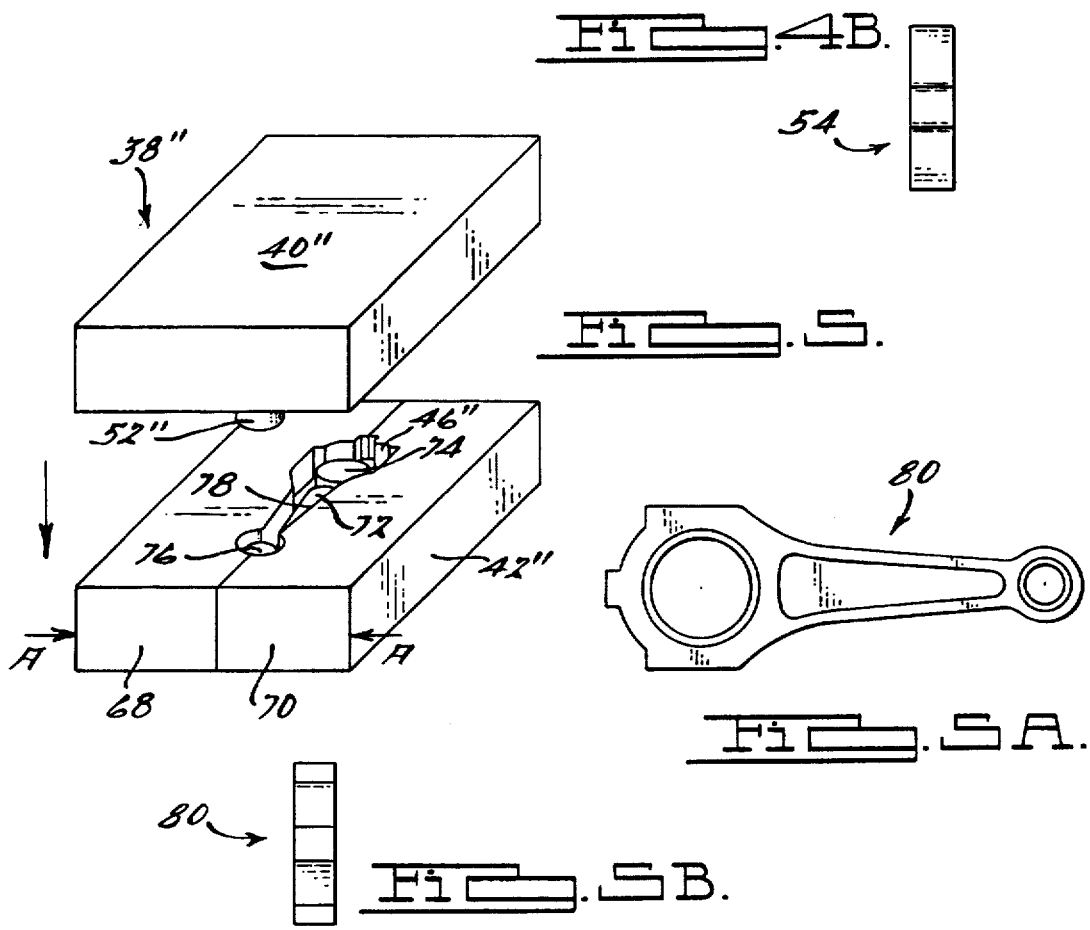

5,544,413

METHOD AND APPARATUS FOR MANFACTURING A FLASHLESS METAL CONNECTING ROD

BACKGROUND OF THE INVENTION

1. Technical Field

The subject invention relates to a method and apparatus for manufacturing a fracturable metal connecting rod, and more particularly it relates to a method and apparatus for manufacturing a flashless metal connecting rod of the type having a one-piece construction and being fracturable into a cap portion and a body portion, through a sequence of forging steps.

2. Discussion

Internal combustion engine connecting rods typically include a first end, or crank end and a second end, or pin end for interconnection of a crankshaft and a piston. The crank end forms a portion of an annular bearing assembly that requires a separable cap and body portions so as to permit insertion of a geometrically complex crankshaft. The pin end forms a portion of a pin bearing assembly for attachment to a piston.

Modern advancement of internal combustion engine technology has resulted in smaller engines which are able to deliver higher horsepower at increasingly higher rpms. Consequently, increased stresses are placed on an engine's connecting rods and its bearings. Such advancements have necessitated corresponding evolutionary changes to connecting rods to meet an increasing demand for lighter and stronger connecting rods.

Connecting rods for internal combustion engines are currently produced using one of three primary metal forming processes, each of which is associated with distinct advantages and disadvantages. The first such process involves "conventional forging" and includes separately forging attachable cap and body portions. In this process, a bar of hot rolled steel, aluminum, or other deformable metal is heated to a forging temperature of approximately 2200°–2350° F. and is placed between multiple cavity top and bottom forging dies in forging presses or hammers. An amount of metal in excess of that necessary to form the resultant product is placed between the dies to ensure complete filling thereof. The cap and body portions are formed through multiple impacts of the presses or hammers. The excess metal is generally directed between opposing dies, resulting in unfinished parts with a flashing surrounding each part at the die intersection.

In a subsequent operation, a set of trim dies is used in a trim press to punch the parts from the flashing. Extensive machining of the body and cap portions is then required which is not only cumbersome and expensive, but also does not ensure a perfectly matching of the cap and body portions under all operating forces.

Advantages associated with conventional steel forging of connecting rods include increased strength characteristics resulting from the natural grain flow of the rolled steel and grain improvement from the forging process. Additional advantages include high production rates, relatively inexpensive raw materials, and the ability to utilize multiple cavity dies. Disadvantages, however, with conventional steel forging processes include increased labor and expense associated with machining excess material from the forged part and the separate cap and body portions to match. The conventional forging process is also disadvantageous because it inherently results in inconsistent weights from part-to-part which necessitate additional machining to balance the final product.

The second method currently used for producing connecting rods is "casting" and involves heating a mixture of scrap metal, typically cast iron, in an electric furnace until it becomes molten. The molten metal is next poured into a "sprew" connected to tunnels or "runners" that permit the molten iron to flow into multiple cavity molds and vent through risers. After cooling of the metal, the iron castings are separated from the molds and the connecting "sprews" and "runners" are removed through machining.

The advantages associated with cast iron connecting rods include the relative low cost of iron, the absence of any secondary trim operation, increased tolerances, and utilization of multiple cavity molds. Disadvantages associated with cast iron connecting rods include lower strength characteristics compared to conventional forging, possible porosity defects, increased mold costs, and increased labor costs to remove the sprews, runners and other excess material. Additional disadvantages include increased costs due to the two part design of the cap and body portions and an absence of grain flow strength.

The third method of manufacturing connecting rods, "powder metal" involves placing a mixture of metal "powder" in a preformed die into a compacting press. The "powder" is compressed until it achieves a mechanical bond. The resulting preform is subsequently heat treated, or sintered, to achieve a chemical bond, thereby strengthening the preform. The perform is heated to a suitable forging temperature and then placed in a forging press which compresses the perform until the desired powder density and geometry is achieved. Excess material is extruded through vertical gaps between the top and bottom dies and is subsequently removed through mechanical grinding or trimming.

In a related "isothermal" powder metal process, the preform remains in the die through the sintering process. The die with the heated preform is transferred to a forging press where forging dies press the preform to specific dimensions independent of density.

Advantages associated with the powder metal forming techniques of manufacturing connecting rods include increased tolerances and thereby reduced machining costs, adequate compressive strength and ease in forming crank and pin holes with plugs. Other advantages include reduced waste material and uniform material composition of the resulting product. Disadvantages associated with the powder metal forming of connecting rods include the complexity of the process, the relatively high cost of "powdered" metal, relatively low tensile strength and impact strength, a potential for premature fatigue failure, and a lack of grain flow strength. Additional disadvantages include sizing and aperture tolerances which are dependent upon shrink variations which result from the sintering and forging processes, increased difficulties in machining the stronger powder compositions, and decreased density relative to other processes such as conventional steel forging.

The powder metal process of manufacturing connecting rods produces a single piece connecting rod having properties which permit the connecting rod to be fractured into a mating cap and body portions with an undulating interface. As is well known in the art, the undulating interface provides non-sliding surfaces where the cap and body portions are bolted together. Properly rejoined, the unique undulating interface prevents micro-shifting of the parts relative to one another and assures more accurate operating alignment. As a result, bearing life increases and the potential for premature failure of the connect rod decreases.

While those previously known methods for manufacturing connecting rods have proven to be commercially viable, each is associated with various above-noted disadvantages. The method and apparatus of the present invention provide advancements in precision forging technology to produce connecting rods which combine the collective major advantages associated with conventional steel forging, cast iron and powder metal connecting rods, without the disadvantages associated with prior art forging methods.

SUMMARY OF THE INVENTION

The present invention comprises a method and apparatus for making an improved flashless metal connecting rod of the type having a one-piece construction and being fracturable into a cap portion and body portion. The invention, in its several aspects, also overcomes the disadvantages associated with currently utilized processes for manufacturing connecting rods.

In a first preferred form, the present invention includes a method of manufacturing a metal connecting rod for an internal combustion engine. The metal connecting rod being of the type having a one-piece construction and being fracturable into a cap portion and a body portion. The preferred method generally comprises the steps of: (a) providing a precision metal preform having a predetermined weight which is substantially identical to the desired weight of the final product; (b) heating the preform to a predetermined forging temperature; (c) sequentially compressing the preform between each pair of a plurality of sets of dies to form the final forging; and (d) controlled cooling of the final forging.

In a second preferred form, the present invention comprises an apparatus for producing a flashless metal connecting rod of the type having a one-piece construction and being fracturable into a cap portion and a body portion. The apparatus includes a plurality of sets of forming dies which are collectively adapted to progressively form a metal preform into a final forged product.

The present invention, in a third preferred form thereof, comprises a flashless, fracturable, one-piece, metal connecting rod manufactured by the method and apparatus of the present invention.

Additional features of the present invention will become more fully apparent from the detailed consideration of the arrangement and construction of the constituent parts and steps of manufacture as set forth in the following description taken together with the accompanying drawings.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a one-piece metal connecting rod manufactured in accordance with the teachings of the present invention;

FIG. 2 is a precision preform used in manufacturing the connecting rod of FIG. 1;

FIG. 3 is a perspective view of a first die used in manufacturing the connecting rod of FIG. 1;

FIGS. 3A and 3B represent a side view and an end view, respectively, of the first intermediate forging formed by the first set of dies shown in-FIG. 3;

FIG. 4 is a perspective view of a second set of dies used in manufacturing the connecting rod of FIG. 1;

FIGS. 4A and 4B represent a side view and an end view, respectively, of a second intermediate forging formed by the second set of dies shown in FIG. 4;

FIG. 5 is a perspective view of a third set of dies used in manufacturing the connecting rod of FIG. 1;

FIGS. 5A and 5B represent a side view and an end view, respectively, of a final forging formed by the third set of dies shown in FIG. 5.

DETAILED DESCRIPTION OF THE PREFERRED EMBODIMENT

Figure 6:
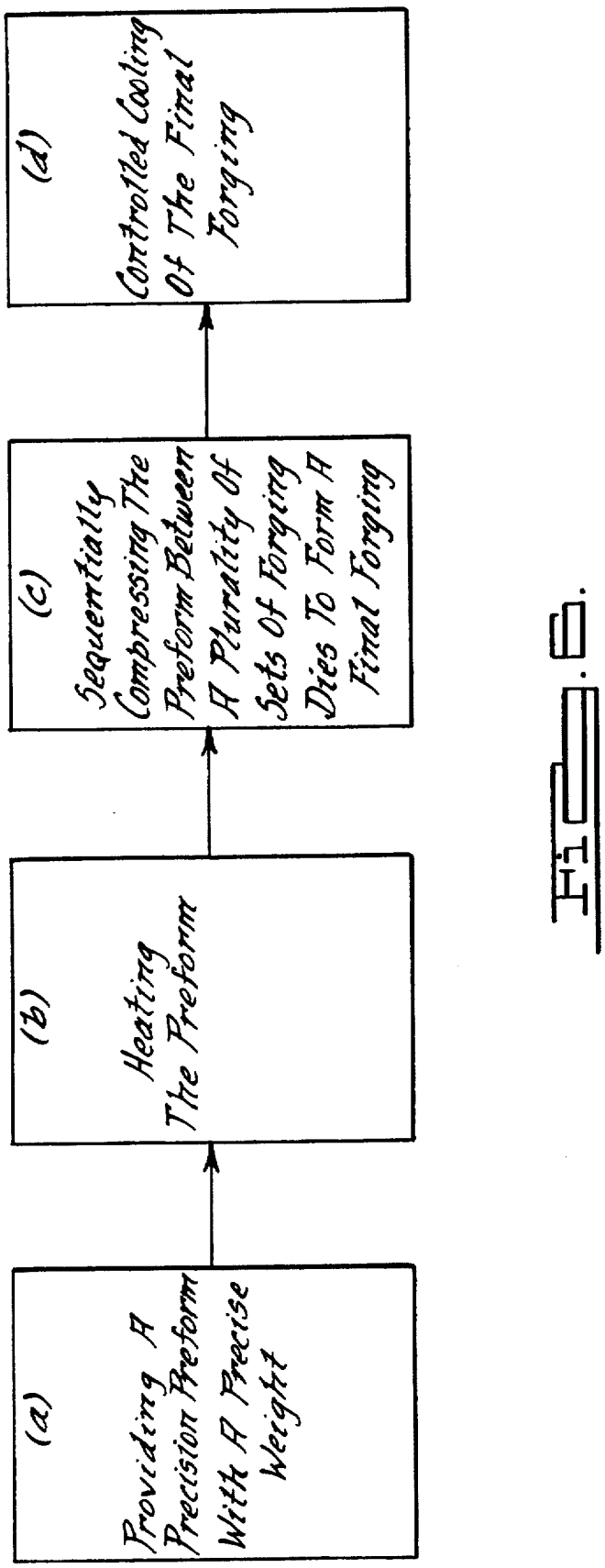
FIG. 6 is a simplified schematic flow diagram of the steps executed in performing the preferred method of the present invention.

Turning now to the drawings, FIG. 1 illustrates a fracturable, one-piece metal connecting rod 10 constructed in accordance with the teachings of the present invention. FIGS. 2 through 6 illustrate a method and apparatus for manufacturing the connecting rod 10 of the present invention. Although the method and apparatus described herein are specifically intended for use to manufacture a fracturable, one-piece metal connecting rod, it is to be understood that such description is exemplary and could be employed in other forging applications to produce a wide variety of other metal flashless products of other non-symmetrical or otherwise irregular geometries.

As shown in FIG. 1, the method and apparatus of the present invention provide a connecting rod 10 having a first end, or crank end, 12 adapted for holding a crank arm and bearing assembly of a crank shaft (not shown) of an internal combustion engine (not shown) in a crank opening 14 defined by an annular cylindrical wall 16. The connecting rod 10 is adapted to be fracturable along a predetermined, approximate fracture plane 18 into a body portion 20 and a cap portion 22. The connecting rod 10 preferably includes shoulders 24 formed on opposite sides of the crank opening 14. The shoulders 24 are formed to include sufficient mass to accommodate fastener openings (not shown) oriented to be substantially perpendicular to the fracture plane 18. At a second end, or pin end, 26 of the connecting rod 10 a cylindrical bearing wall 28 is provided which defines a pin opening 30 which is adapted to receive a pin bearing (not shown) of the engine.

As shown in FIG. 6, the preferred method steps of the present invention for manufacturing a flashless metal connecting rod 10 are shown in a simplified flowchart. The method is particularly well suited for forming a flashless metal connecting rod 10 of the type having a one-piece construction and being fracturable into a cap portion and a body portion. The method generally comprises the steps of: (a) providing a precision preform having a predetermined, precision weight; (b) heating the preform to a predetermined forging temperature; (c) sequentially compressing the preform between each of a plurality of sets of dies to form a final forged product; and (d) controlled cooling of the final forged product to assure that the final forged product cools quickly and evenly.

Step (a) is carried out by providing a preform 32 having a predetermined shape and closely predetermined weight. An exemplary preform 32 is illustrated in FIG. 2. In the preferred embodiment, the preform 32 is preferably constructed of a high carbon steel, or other suitable metals with similar properties. The preform 32 can be manufactured by any of a number of metal forming techniques well known in the art, including but not limited to extruding, cross-rolling, machining or any combination of known techniques. The preform 32 includes a generally cylindrical cross-section. Further, in the preferred embodiment, the preform 32 includes first and second ends 34, 36 which are enlarged so as to provide sufficient mass to form the required geometry of the connecting rod 10. It should be appreciated that the preform 32 illustrated in FIG. 2 is merely exemplary and that the geometry of the preform 32 is dependent upon the size and complexity of the ultimate part to be manufactured.

The net weight of the preform 32 is approximately equivalent to the desired net weight of the resulting connecting rod 10. The forming procedures of the method of the present invention, which will be detailed further below, incorporate closed dies and include successive forming steps adapted to produce an end product from substantially 100% of the preform 32. In this regard, the method and apparatus of the present invention reduces production costs by eliminating waste resulting from flashing or burring which typically forms during conventional forging, casting, and powder metal manufacturer of connecting rods. The method and apparatus of the present invention also substantially eliminate subsequent machining operations. Further, they also eliminate or substantially reduce the need to balance the product by machining weight lugs.

In step (b) of the present invention, the preform 32 is heated to a suitable forging temperature of approximately 1700° F.– 2250° F. Preferably, induction heating is employed to heat the preform 32. Induction heating provides the advantages of uniform and rapid heating of the preform 32. It is to be appreciated that the temperature ranges will vary considerably depending on the type of metal utilized for the preform 32.

Step (c) of the present invention involves sequentially compressing the preform 32 between a plurality of sets of forging dies to progressively transform the preform 32 into the one-piece connecting rod 10. In the exemplary method of the present invention illustrated throughout the drawings, step (c) includes three (3) sub-steps, each of which utilizes a unique set of forging dies to sequentially transform the preform 32 into a final configuration. However, it will be appreciated by those skilled in the art that any number of sets of dies adapted to completely fill the particular geometry of the die cavity without producing flash or burr may be employed.

Turning to FIGS. 3–5, the sub-steps involved in the forging portion of the method of the present invention will be discussed in detail. The method preferably utilizes three sets of forging dies which are shown in FIGS. 3 through 5. For ease of reference, common elements of the sets of dies are provided with identical reference numerals. The common elements of the second and third sets of dies (shown in FIGS. 4 and 5) are additionally identified with a single prime and a double prime, respectively.

As shown in FIG. 3, the first set of forging dies 38 is preferably a single action die which includes an upper die 40 and a lower die 42. The first set of dies 38 functions to form the preform 32 into a first intermediate forging 44. The lower die 42 of the first set of dies 38 includes a female, cavity portion 46 which cooperates with a male punch 52 of the upper die 40 to form the first intermediate forging 44. The cavity portion 46 includes a bottom surface 48 and a peripheral side wall 50 extending thereabout which generally are a mirror image of a bottom surface and side surface, respectively, of the first intermediate forging 44. The punch 52 of the upper die 40 includes side surfaces which generally correspond with the side wall 50 of the cavity 46 of the lower die 42. Throughout the drawings, the punch 52 and cavity portions of the die sets are not illustrated in significant detail. However, those skilled in the art will readily appreciate the details of the elements from this detailed description and from the illustrations of the products produced by the punch and cavity portions. The upper and lower dies 40, 42 are drawn together and in a single stroke to compress the preform 32 therebetween. As a result, the first enlarged end 34 of the preform 32' is flattened and the preform 32 otherwise begins to form the ultimate part shape.

The first intermediate forging 44 can be urged from the cavity 46 by an ejector (not shown) disposed in the bottom surface of the cavity 46. This technique is well known in the art and need not be further detailed herein.

Referring to FIG. 4, the second set of dies 38' which is used during the second sub-step of the forming portion of the method of the present invention is illustrated. The second set of dies 38' similarly include an upper die 40' including a punch 52' and a lower die 42' defining a cavity portion 46'. The cavity portion 46' and the punch 52' cooperate to further form the preform 32 into a second intermediate forging 54 as illustrated in FIGS. 4A and 4B. In the second set of dies 38', the cavity portion 46' and the punch 52' each include first and second cylindrical protrusions 56, 58 adapted to form first and second cavities 60, 62 on both the top and bottom surfaces of the preform 32. The second intermediate forging 54 is preferably formed by a single stroke of the punch 52' which compresses the first intermediate forging 44 between the punch 52' and the cavity portion 46' of the second set of dies 38'. Additionally, the punch 52' and cavity portion 46' each include an elongated protrusion 64 interdisposed between the cylindrical protrusions 56, 58, the elongated protrusions 64 cooperate to create a web 66 which results in a substantially I-beam type cross-section in the second intermediate forging.

Turning to FIG. 5, the third set of dies 38" is illustrated. Similar to the second set of dies 38', the third set 38" includes an upper die 40" and a lower die 42". The upper die 40" includes a punch 52" . The third set of dies 38" is a multi-action die set in which the lower die includes a first half 68, a second half 70 and a base cavity portion 72 which cooperate to define a cavity 46". Similar to the second set of dies 38', the punch 52" and the base cavity portion 72 of the third set of dies 38" are each formed to include first and second cylindrical protrusion 74, 76 and an elongated protrusion 78. The protrusions of the lower die 42" are disposed on the base cavity portion 72. The protrusions of the third set of dies 38" are slightly larger than the corresponding protrusions of the second set of dies 38' to thereby function to further transition the preform 32 into a final forging 80.

The geometry of the side wall of the punch 52" is configured to provide a sufficient gap between the walls of the cavity 46" defined by the first and second halves 68, 70, of the lower die 42" and permit insertion of the punch 52" into the cavity 46".

The prevention of burring is achieved in the third set of forming dies 38" through the multiple-action of the dies. In this regard, near the end of the stroke of the punch 52", the first and second halves 68, 70 of the lower die 42" are advanced towards one another (as indicated by the arrows in FIG. 5 identified with the reference letter A). This movement of the first and second halves 68, 70 substantially eliminates the gap between the sidewalls of the punch 52" and the cavity walls and as a result eliminates space for a burr to form. It will be appreciated by those skilled in the art that the negligible gap which remains is sufficient to release air and other gases otherwise trapped within the .cavity 46". Thus, the final forging 80 is produced (see FIGS. 5A and 5B) which is flashless and burrless and, therefore, does not need the extensive machining associated with prior techniques of manufacturing connecting rods.

Step (d) involves the controlled cooling of the final forging 80. Preferably, the final forging 80 is rapidly and uniformly reduced to ambient temperature through microalloy techniques which are well known to those skilled in the art. Such controlled cooling produces a uniform microstructure and renders the metal less ductile. As a result, the connecting rod 10 can be fractured along the fracture plane 18 with minimal distortion.

The final forgings 80 are subsequently shot blast cleaned to remove forging scale which typically results from heating of the preform 32. With complex figurations, any excess metal can be removed through grinding or machining operations.

The final step in producing the flashless, fracturable connecting rod 10 of the present invention involves completing the crank opening 14 and the pin opening 30 through the first and second cavities 60, 62, respectively, of the final forging 80. The openings 14, 30 are preferably CNC machined within a tolerance of ±0.005 inches and a hole to hole tolerance of ±0.005 inches. Alternatively, the openings 14, 30 can be hot pierced or otherwise formed by any of a number of suitable techniques well known in the art.

Subsequently, the one-piece fracturable connecting rod 10 is fractured along the fracture plane 18 into the cap portion 22 and the body portion 20. As is well known in the art, the cap portion 22 and body portion 20 can be suitably bored and bolted together.

The method and apparatus of the present invention thus provides a unique series of steps which allow a virtually flashless and burrless forging to be produced. The method described herein provides significant cost advantages over prior art forging methods since only a precise quantity of raw material is used for the preform 32, which virtually eliminates the flash which would otherwise result on the finished forging. Consequently, the need for a secondary trim operation is eliminated. Similarly, the need for extensive and precision machining typically required at the end of the prior art forging process is substantially eliminated. This results in more uniform and precise weight from part-to-part without the costly, labor intensive machining needed to control the weight of the final forging 80. Since virtually no flash is produced by the method of the present invention, there is significantly less raw material waste which results from the steps of the preferred method described herein. Additionally, the present invention provides increase strength characteristics over casting and powder metal connecting rods while utilizing the relatively inexpensive raw materials. Finally, and importantly, the final forging 80 produced is readily fracturable at ambient temperature without the need for performing additional machining steps prior to the fracturing operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method of manufacturing a flashless metal connecting rod for an internal combustion engine of the type having a one-piece construction and being fracturable into a cap portion and a body portion, the method comprising the steps of:
    (a) providing a preform;
    (b) heating said preform;
    (c) sequentially forging the preform between at least one multi-action die set to form a final flashless forging; and
    (d) controlled cooling of the final forging; wherein said at least one multi-action die set includes a lower die having independently movable first and second portions and an independently movable upper die such that said first and second portions of said lower die are urged together as said upper die is moved toward said lower die.

2. The method of claim 1, wherein step (a) comprises providing a preform having a predetermined weight substantially identical to a desired weight of said final forging.

3. The method of claim 1, wherein step (b) comprises induction heating said preform.

4. The method of claim 3, wherein said induction heating comprises increasing a temperature of said preform to approximately between about 1700° F.–2250° F.

5. The method of claim 1, wherein step (c) comprises:
    compressing said preform between a first die set to form a first intermediate forging;
    subsequently compressing said first intermediate forging in a second die set to form a second intermediate forging; and
    subsequently compressing said second intermediate forging in a third die set to form a final forging having a burless and flashless configuration.

6. The method of claim 1, wherein step (d) comprises effecting said controlled cooling through micro-alloy techniques to produce a uniform microstructure for said final forging.

7. A method of manufacturing a flashless metal connecting rod for an internal combustion engine, the connecting rod further being fracturable into a cap portion and a body portion, the method comprising the steps of:
    (a) providing a precision weight preform, wherein the weight of said preform is substantially identical to a weight of a desired final forging;
    (b) induction heating said preform;
    (c) compressing said preform between a first die set to form a first intermediate forging;
    (d) subsequently compressing aid first intermediate forging between a second die set to form a second intermediate forging;
    (e) subsequently compressing said second intermediate forging between a third die set to form a final burless and flashless forging having a weight substantially identical to said weight of said preform;
    (f) controllably cooling said final forging to produce a uniform microstructure therefor;
    (g) providing said third die set with a lower die having independently movable first and second portions; and
    (h) urging said first and second portions of said lower die of said third die set together as said third die set is compressed to form said final forging.

8. The method of claim 7, wherein step (b) comprises induction heating said preform to a temperature within a temperature range of approximately 1700° F.–2250° F.

9. The method of claim 7, wherein the step of compressing said preform between said first die set operates to compress a first enlarged end of said preform to thereby flatten said first enlarged end; and wherein compressing said first intermediate forging between said second die set results in an I-beam construction for said second intermediate forging.

10. A method of manufacturing a flashless metal connecting rod for an internal combustion engine of the type-having a one-piece construction and being fracturable into a cap portion and a body portion, the method comprising the steps of:

(a) providing a precision weight preform having a weight substantially identical to a weight of a desired final forging;

(b) induction heating said preform to a temperature within a temperature range of about 1700° F.–2250° F.;

(c) compressing said preform between a first die set such that a first enlarged end of said preform is flattened to form a first intermediate forging from said preform;

(d) subsequently compressing said first intermediate forging between a second die set to impart an I-beam construction to said first intermediate forging, thereby causing said first intermediate forging to form a second intermediate forging;

(e) causing said second intermediate forging to be compressed between an upper die and a pair of lower dies of a third die set, wherein said lower dies are urged toward each other as said upper die is urged toward said lower dies, to thereby produce a burless and flashless final forging having a weight substantially identical to said preform; and (f) controllably cooling said final forging through microalloy techniques to cause said final forging to have a uniform microstructure.

11. The method of claim 10, wherein the step of compressing said preform between said first die set comprises placing said preform within a lower die of said first die set and urging an upper die of said first die set against said preform, to thereby compress said preform and form said first intermediate forging.

12. The method of claim 10, wherein the step of compressing said first intermediate forging within said second die set comprises placing said first intermediate forging within a cavity of a lower die of said second die set and urging an upper die of said second die set into contact with said first intermediate forging, to thereby transform said first intermediate forging into said second intermediate forging.

13. The method of claim 10, wherein the step of compressing said second intermediate forging in said third die set comprises the step of placing said second intermediate forging within said first and second portions of said lower die of said third die set; and urging said first and second portions of said lower die towards each other as said upper die is urged towards said second intermediate forging such that sufficient clearance is provided to enable a portion of said upper die to enter a cavity formed by said first and second lower die portions as said second intermediate forging is compressed.

14. The method of claim 13, further comprising the step of shot blast cleaning said final forging to remove forging scale present on said final forging.

* * * * *

UNITED STATES PATENT AND TRADEMARK OFFICE
CERTIFICATE OF CORRECTION

PATENT NO. : 5,544,413
DATED : August 13, 1996
INVENTOR(S) : Robert J. Stevens

It is certified that error appears in the above-indentified patent and that said Letters Patent is hereby corrected as shown below:

On the title page:Item [56]

U.S. Patent Documents, reference 1,350,178;

"5/1920" should be -- 8/1920 --;

On the Title Page under U.S. Patent Documents, reference 3,751,080;

"9/1973" should be -- 8/1973 --;

Column 4, line 3
"in-FIG." should be -- in FIG. --.

Column 7, line 6,
".cavity" should be -- cavity --.

UNITED STATES PATENT AND TRADEMARK OFFICE
CERTIFICATE OF CORRECTION

PATENT NO. : 5,544,413
DATED : August 13, 1996
INVENTOR(S) : Robert J. Stevens

It is certified that error appears in the above-indentified patent and that said Letters Patent is hereby corrected as shown below:

Column 8, line 14, Claim 1, begin new paragraph with "wherein said ....."；

Column 8, line 53, Claim 7,

"aid" should be -- said --.

Signed and Sealed this

Tenth Day of December, 1996

*Attest:*

BRUCE LEHMAN

*Attesting Officer*    *Commissioner of Patents and Trademarks*